United States Patent [19]
Strnad, Jr.

[11] Patent Number: 6,003,568
[45] Date of Patent: Dec. 21, 1999

[54] AUTOMATIC FUELING SYSTEM AND COMPONENTS THEREFOR

[75] Inventor: Rudolph A. Strnad, Jr., Indian Wells, Calif.

[73] Assignee: R. Strnad Enterprises, LLC, Indian Wells, Calif.

[21] Appl. No.: 08/974,702

[22] Filed: Nov. 19, 1997

[51] Int. Cl.⁶ .................................................. B65B 1/04
[52] U.S. Cl. ............................ 141/98; 141/94; 141/302; 220/86.2; 123/519
[58] Field of Search ............................... 141/94, 98, 301, 141/302; 220/86.2; 123/519

[56] References Cited

U.S. PATENT DOCUMENTS

| | | | |
|---|---|---|---|
| 3,642,036 | 2/1972 | Ginsburgh et al. | 141/94 |
| 4,862,856 | 9/1989 | Yokoe et al. | 123/519 |
| 4,881,581 | 11/1989 | Hollerback | 141/113 |
| 5,603,349 | 2/1997 | Harris | 137/588 |
| 5,609,190 | 3/1997 | Anderson et al. | 141/94 |
| 5,638,875 | 6/1997 | Crofitsen | 141/94 |
| 5,671,786 | 9/1997 | Crofitsen | 141/94 |
| 5,715,963 | 2/1998 | Boll et al. | 220/86.2 |

*Primary Examiner*—Steven O. Douglas
*Attorney, Agent, or Firm*—Lyon & Lyon LLP

[57] ABSTRACT

An automatic fueling system includes a pump having a telescoping arm capable of placement in three-dimensional space, a flexibly mounted nozzle on the end of the arm and a docking cone to mate with the fuel port on a vehicle. A camera provides a view of the side of the vehicle on a monitor with guides visible to the operator of the vehicle to assist in locating the vehicle within range of the pump. A light and a camera located adjacent to the nozzle are used to recognize retro-reflective light from an annular target about the intake port. Multiple approximations of the distance and location of the intake port are made with the nozzle moving closer to mating with the intake port. A data link is provided through the mated nozzle with a keypad accessible by the vehicle operator. The vehicle includes a control actuator which selectively couples actuator cables associated with the fuel door and the fuel inlet valve with the emergency brake cable to engage the emergency brake, open the fuel door and open the inlet valve. A vacuum system on an evaporation canister insures that vapor is drawn from the fuel tank as it is being displaced by incoming fuel.

22 Claims, 8 Drawing Sheets

6,003,568

AUTOMATIC FUELING SYSTEM AND COMPONENTS THEREFOR

BACKGROUND OF THE INVENTION

The field of the present invention is automatic fueling systems for vehicles.

The fueling of vehicles without manual intervention is currently being explored using a variety of approaches. A number of barriers exist to the successful implementation of automatic fueling systems; and yet substantial advantage is anticipated by the implementation of a successful system.

The lack of uniformity among vehicles poses a first and very substantial barrier to automatic fueling. It is anticipated that fueling stations must accommodate conventional vehicles with fuel ports located on either side of the vehicle, at varying heights and at varying distances from other features of the vehicle. They also must anticipate light duty trucks, vans and the like with even more widely divergent fuel port locations as well as cap mechanisms. Truck service stations servicing tractor-trailer rigs and other large trucks offer even greater challenges in the diversity of fuel ports. The cap and entry also provide great variety among vehicles.

In addition to the mechanical variety of equipment served, other requirements are of concern. Possible marring of the vehicle or spillage of fuel are highly objectionable. Communication regarding the product desired, the financial transaction and the like must be handled accurately and privately at the point of sale. Avoiding any consequences from mistakes by vehicle operators forms an even greater challenge to the concept of automatic fueling.

In addressing the foregoing problems, a variety of approaches have been developed for the fueling system. A first approach has been to completely change the vehicle fuel tank so as to accommodate specific filling techniques. One such device is illustrated in U.S. Pat. No. 4,681,144 which requires a fuel entry port below the vehicle tank with a pump and delivery mechanism located beneath the driveway. Another approach has been to use an overhead mechanism and sophisticated locating system in an effort to accommodate the very wide variety of fuel port placements. The overhead system attempts to be universally flexible in terms of locating and engaging the vehicle fuel port somewhat regardless of its location on the vehicle. Thus, systems have been contemplated which have such varying approaches as to require an all new fuel system on the vehicle to very rigorous internal flexibility to accommodate wide variety in fuel port locations.

Certain of the proposed systems require changes to the vehicle fuel port as noted above. Traditionally, the fuel port includes an entry port with a threaded cap or bayonet coupling. A cover coplanar with the body is typically pivotally mounted over the fuel cap with most modern automobiles. Practical automatic systems have not been developed which can accommodate the wide variety of such devices inhibiting access to the entry port of the fuel tank. One device which accommodates an automatic system without substantial change to the fueling equipment on the vehicle is illustrated in U.S. Pat. No. 5,163,473, the disclosure of which is incorporated herein by reference.

The advantages of automatic fueling are substantial. A large amount of fueling is performed by the vehicle operator today rather than by service station attendants. Albeit the choice is often made by the operator to fuel their own vehicle based on a marginal advantage in price, concerns regarding personal safety, cleanliness and mere inconvenience exist. Untrained and inattentive people operating the refueling systems also can result in excessive discharge of fuel vapors into the atmosphere, spillage on the ground and on the vehicle and overfill. Vehicle operators doing the fueling also can impede sales at busy stations. Constraints based on safety such as fuel flow rate have also been imposed based on the perceived competence of the untrained person acting to fill the vehicle. All of these circumstances and concerns can be eliminated through the employment of an automatic fueling system.

Fueling systems and fuel tank systems have been developed and improved in a step-by-step process which has resulted in complication and compromise. Two principal areas of concern are pollution controls and crash safety. Among current systems for delivering fuel, vapor recovery through the fuel nozzle provides a marginally effective mechanism for reducing pollution. Upon the filling of a tank, the gaseous mixture including polluting vapor is displaced. Such current systems include counterflow of vapor within the inlet pipe and through an annular passage in the nozzle to the station tank. Such flow can create problems, premature shutoff and burping. Further, a relatively efficient seal at the nozzle is necessary. As flow resistance of vapor back into the station tank is substantially greater than simple release into the atmosphere, leakage is almost-a constant problem. Techniques have been contemplated for passing the vapor through a recovery system with the entrained air released to atmosphere. Such a system contemplates a vent on the vehicle itself. However, pressure is required to pass the vapor through the collecting system. This again requires a substantial seal at the pump nozzle. The ability to clear the collection system is also a problem.

Another area of concern affecting vehicle fuel tanks is the lack of crash worthiness. Today tanks can be made relatively strong and burst resistant. However, the fuel filler pipe remains vulnerable and relatively exposed beneath sheet metal. Side impact, shearing impact and rollover have the possibility of damaging or detaching the filler pipe with potentially disastrous consequences.

SUMMARY OF THE INVENTION

The present invention is directed to an improved vehicle fueling system. A number of mechanisms, combinations and methods are contemplated as a means to enhance vehicle fueling.

In a first, separate aspect of the present invention, an automatic fueling system contemplates a mechanism located on the vehicle for actuating the fuel door, if one is employed, and the inlet valve to the fuel tank. An inexpensive approach for actuating the fuel door and valve include a linkage with the parking brake system. An electric actuator may act to engage the inlet valve opening mechanism with the emergency brake cable. Application of the emergency brake once the electric actuator has been energized would result in opening of the fill pipe. Use of the emergency brake for this operation is both economical and provides the safety advantage that the vehicle is unlikely to roll during fueling. During vehicle running, the brake system remains uncoupled with the valve opening mechanism in order that distortion of the brake system through crash or manipulation of the brake system either inadvertently or for parking purposes will not result in opening of the valve.

In a second, separate aspect of the present invention, a rigidly mounted nozzle base supporting the camera sensor and light is associated with a flexibly mounted nozzle spout which provides rigidity for resisting a grossly inappropriate placement and yet provides flexibility for properly seating within the fill pipe. Micro switches, electrical contacts and the like are contemplated for insuring an appropriate placement of the nozzle before fueling can begin. Naturally, any disruption of such sensing systems demands immediate shutdown of the fueling system such that gross separation does not result in a fuel spill.

In a third, separate aspect of the present invention, a data link between the station and an input source or memory on the vehicle extends through the nozzle and fill pipe interface. Data transfer can thereby be positive and secure.

In a fourth, separate aspect of the present invention, a fuel tank system employing an active vacuum system to draw vapor and gases from the tank during filling through a vapor recovery device acts to prevent vapor discharge at the fuel filler pipe inlet. Such a system may be actuated upon opening of the fuel filler inlet valve.

In an fifth, separate aspect of the present invention, the fuel filler valve is positioned at the fuel tank. The fill pipe from its inlet to the valve is, therefore, open to atmosphere. The valve may be positioned inwardly of vehicle frame members in a protected location when associated with the tank itself. A nonwetting surface on the fill pipe and a fuel door closure protect the pipe and provide for voiding of the pipe after filling.

In a further, separate, aspect of the present invention, various ones of the preceding aspects are contemplated to be employed in combination to achieve greater enhancement of the fuel filling system.

Accordingly, it is an object of the present invention to provide an improved fuel filling system and components thereof. Other and further objects and advantages will appear hereinafter.

DETAILED DESCRIPTION OF THE PREFERRED EMBODIMENTS

Figure 1:
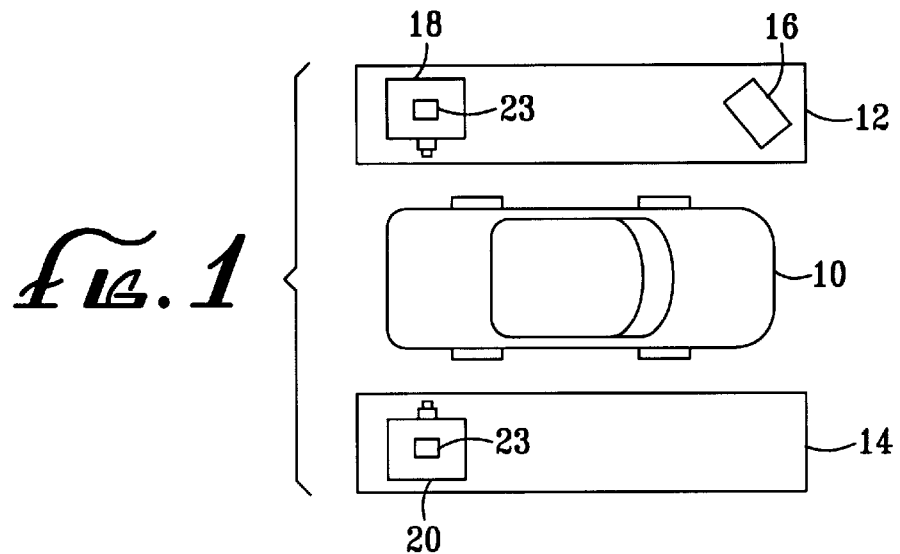
FIG. 1 is a plan view of a station layout for fueling of vehicles.
Figure 2:
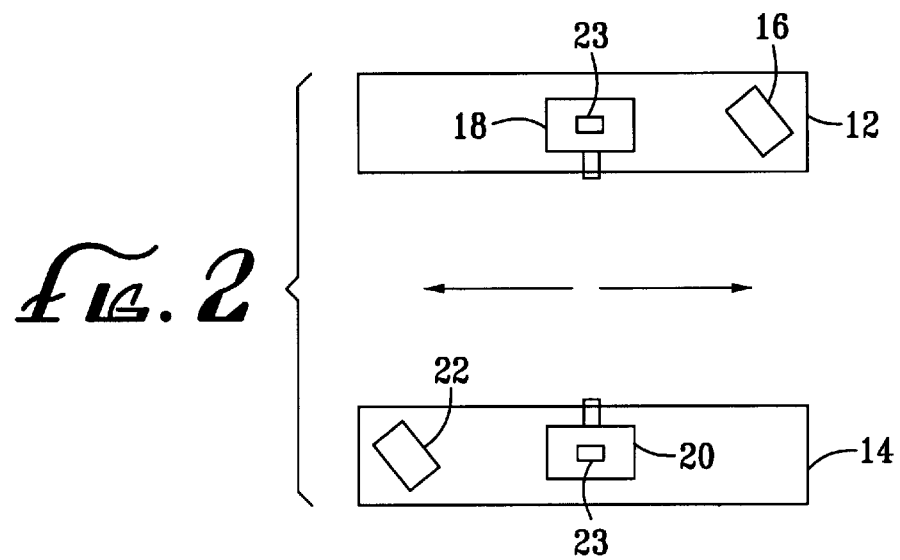
FIG. 2 is an alternate station layout for the fueling of vehicles.
Figure 3:
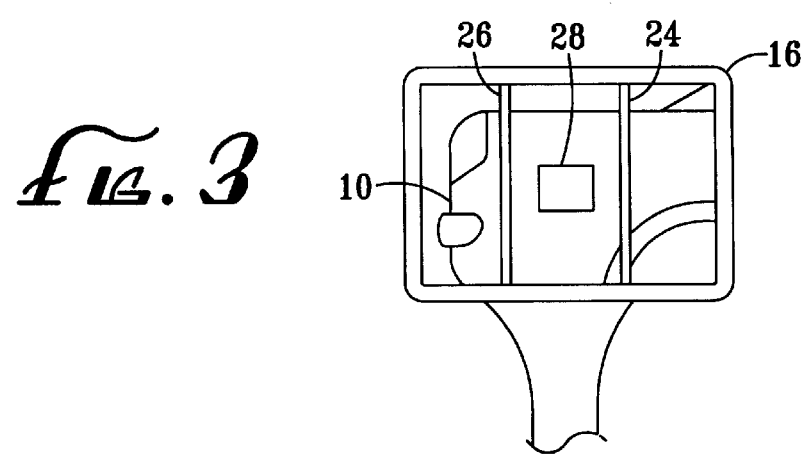
FIG. 3 is a monitor with a view of the fueling target area.

Turning in detail to the drawings, FIG. 1 illustrates a plan view of a filling station with automatic fueling equipment. A vehicle 10 is shown to be located between two islands 12 and 14. The island 12 includes a monitor 16 and a pump assembly 18. On the island 14, a pump assembly 20 is located in a position opposed to the first pump assembly 18. A different set up is illustrated in FIG. 2 where a second monitor 22 is located on the second island 14. With the second monitor 22, vehicles can approach from either direction.

A number of factors affecting station layout are advantageously considered. The layout is preferably intuitive and should maximize throughput and minimize congestion. The vehicles to be accomodated include left and right hand fill and all automobile, van, pickup and sport-utility vehicle sizes without a feeling of constraint. There should be sufficient guides to insure proper positioning. Emperical testing suggests that each island 12, 14 is preferably 4'×16'. A longer island may promote better alignment but real estate in a station is often at a premium. Spacing between islands of 8'10" is adequate for all conventional personal vehicles. An entrance length of 4' from the beginning of the island to the center of the pump 18, 20 promotes alignment. 10' between pump center and monitor screen 16, 22 is also preferred.

To appropriately locate the vehicle longitudinally between the islands 12 and 14, the monitor 16 continuously receives pictures from the pump assemblies 18 and 20. A split screen or alternating views may be employed to show both sides of the vehicle if an electronic identifier, bar code or the like is not included on the vehicle to show such attributes as fill side. The pump assemblies 18 and 20 have a camera 23 centrally located to take a real time image of the side of the vehicle to identify when the vehicle is properly positioned for fueling. The camera 23 is located on the pump structure unless combined with a target acquasition camera. Two vertical lines 24 and 26 superimposed on the monitor define the target area to be achieved in locating the vehicle. The fuel door 28 on the vehicle 10 can be easily positioned by the operator of the vehicle between these lines 24 and 26. The lines are preferably displaced from the edge of the screen of the monitor 16 so that the operator can judge when the fuel access door 28 is coming into alignment by watching the monitor. The longitudinal distance at the vehicle represented by the spacing between the vertical lines 24 and 26 is dependant upon the lateral capabilities of the pump location system. A target area of 8" is adquate for reasonably attentive drivers. The incorporation of the vehicle operator into the alignment process through the use of a real time image can greatly reduce the complexity of the fueling station equipment necessary for locating the fuel port. Even carelessness and ineptitude can be overcome through the use of reverse gear.

The camera 23 on the left hand side of the vehicle preferrably has an image reversing feature. The image is more intuitive moving from left to right, the same direction as the vehicle. The camera 23 on the right hand side of the vehicle does not need this reversal. A text inserter 29 allows the superpositon of the lines 24 and 26, instructions, monitoring data and advertising.

Figure 4:
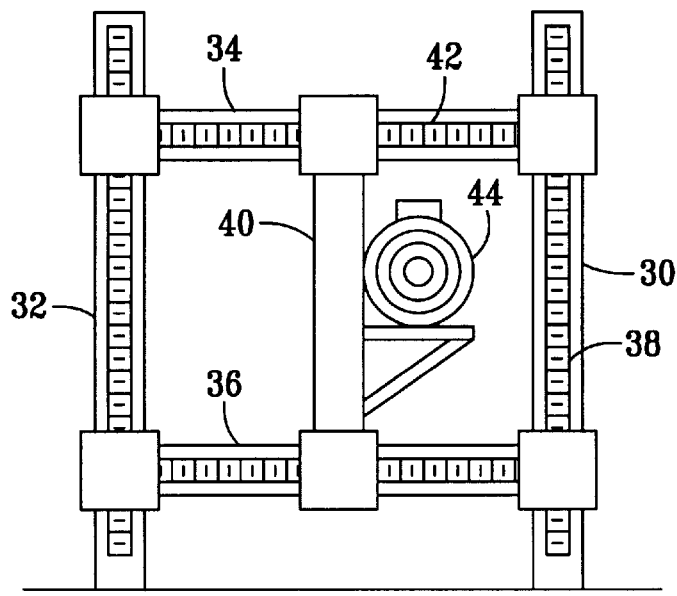
FIG. 4 is a front view of a nozzle delivery system.
Figure 5:
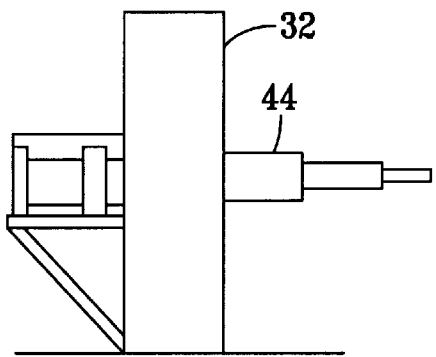
FIG. 5 is a side view of the delivery system of FIG. 4.
Figure 7:
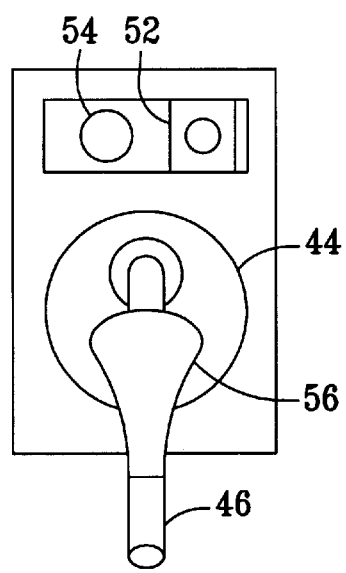
FIG. 7 is a front view of the light and sensor of the nozzle assembly.

Looking to the mechanism of the pump assembly 18 and 20, a conventional fuel supply to the pump nozzle is contemplated. The pump may be a three-axis translational robot, a rotary turret capable of vertical adjustment and nozzle extension or a swivelling arm having multiple links with additive degrees of freedom. Selected as a preferred embodiment is the three-axis translational robot as illustrated in FIGS. 4 and 5. Vertical tracks 30 and 32 are affixed to the ground. Horizontal supports 34 and 36 are associated with the vertical tracks to move up and down thereon. Coupling the vertical tracks 30 and 32 and the horizontal supports 34 and 36 are jack screws 38 mounted in the vertical tracks 30 and 32 and received by the horizontal supports 34 and 36. Control of these jack screws 38 provides for vertical orientation of the nozzle system. A carriage 40 is similarly mounted to the horizontal supports 34 and 36 with horizontally extending jack screws 42. The location of the nozzle is thus provided with a range of motion in a rectangular field through coordination between the vertical jack screws 38 and horizontal jack screws 42 operating on the components. A field of 8" wide ×17" high is believed to cover necessary flexibility.

A telescoping arm 44 is positioned and affixed to the carriage 40. The arm 44 includes a plurality of concentric cylinders telescoped together. The cylinders may be controlled through pneumatics or hydraulics. Another solution has been to attach the outermost cylinder to the end of a chain system having the capability of acting both in constrained compression as well as tension. Such systems typically include chain links which can bend relative to one another in only one direction. By means of a guide, the chain is kept from bending in the one direction, allowing it to operate in compression. Thus, the third degree of freedom to move the nozzle out into engagement with the fuel port of a vehicle or retract same is provided. A range of 43" has been found adequate for accomodating vehicle distance variations from the island, given the constraining island on the other side, and sufficient retraction to keep the nozzle out of the lane in the retracted position. In spite of the illustrations of FIGS. 4 and 5, a housing is contemplated to be placed over the mechanism, allowing the telescoping arm 44 to extend outwardly through a hole.

Figure 6:
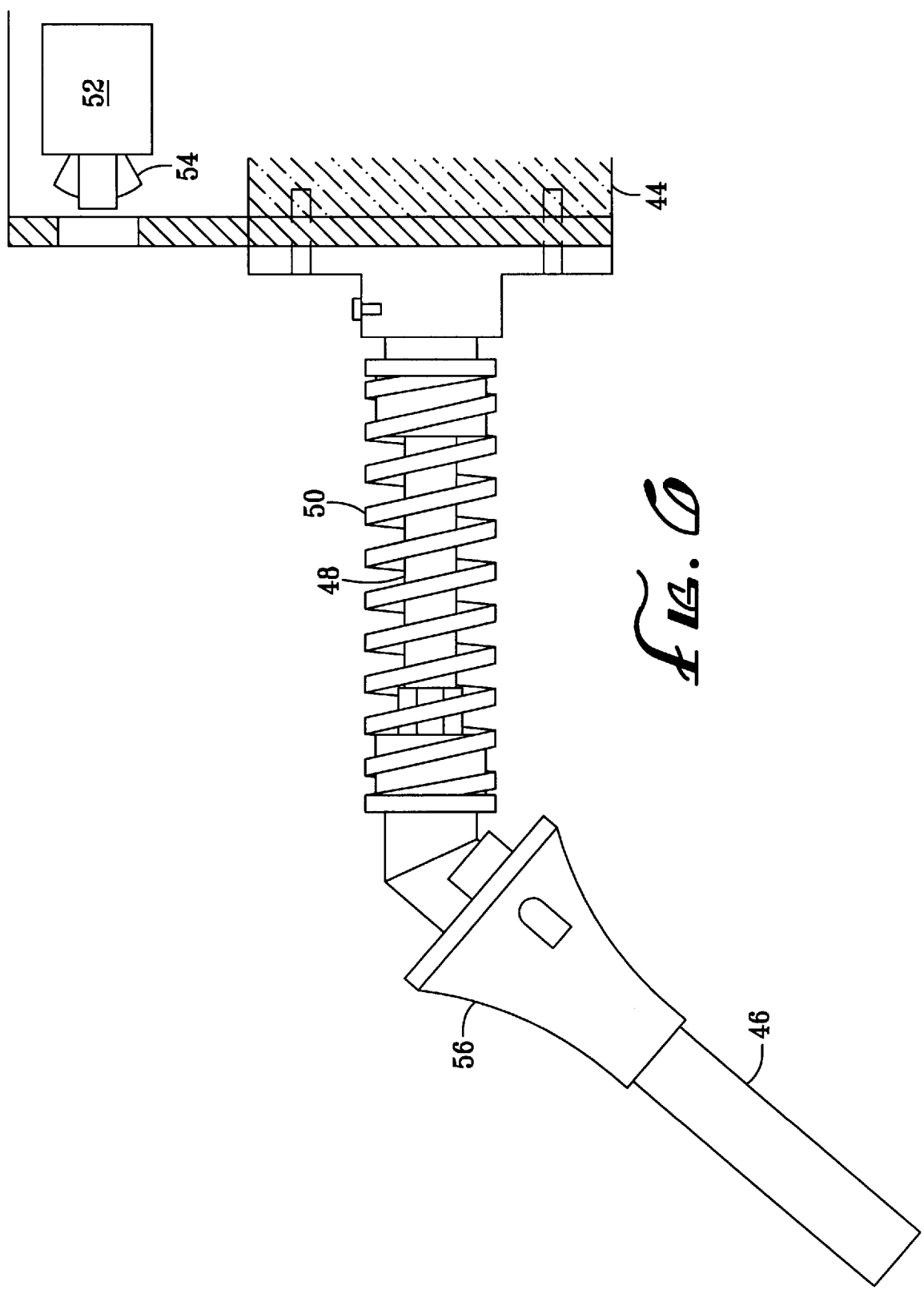
FIG. 6 is a cross-sectional side view of a nozzle.

A nozzle 46 is associated with the end of the telescoping arm 44 as best seen in FIG. 6. The nozzle 46 is joined with the telescoping arm 44 with a resilient coupling. The nozzle 46 is itself preferably rigid with a 45° angle near the base. Even so, a resilient coupling between the telescoping arm 44 and the rigid nozzle 46 allows accommodation of the fuel fill pipe orientation and construction. An elastomeric tube 48 joins the distal end of the telescoping arm 44 with the nozzle 46. Hose clamps, beads about the rigid components and the like commonly available for conveying fluid products may be employed. An elastomerlic tube accomodates both angular displacement and axial shift of the nozzle relative to the arm 44. A compression spring 50 wrapped about the elastomeric tube 48 and placed in compression can be used to stabilize orientation of the nozzle 46 relative to the arm 44 to a greater extent than simply provided by the elastomeric tube 48. The spring 50 requires stops on the rigid components to constrain the spring in compression.

A target acquisition system is provided on the nozzle 46. Ultrasonic sensors, photoelectric sensors, inductance sensors, "capaciflector" sensors and 2D vision sensors were considered and are possible. Ideally, such a sensor would be robust in the environment of the filling station, accurate to about ¼ inch, have a cone of vision of 45°, recognize a target five feet away and have a passive target component not likely to be obscured by dirt or ambient conditions. A 2D system is provided as the preferred embodiment. A camera 52 and a light source 54 are mounted adjacent the nozzle 46 on the telescoping arm 44. Both the camera 52 and the light source 54 may be located away from the end of the nozzle and brought into proximity of the nozzle through fiber optic cables. The camera is preferably configured to sense the light from the light source 54. The light source may use a signature wavelength band or bands, polarization or the like so that it can be distinguished from ambient sources. For example, the camera 52 and the light source 54 may have matching filter or polarized lenses.

Also mounted to the nozzle 46 is a docking cone 56. The docking cone 56 is located on the nozzle 46 such that it performs seating for the nozzle 46 when mating with the fuel pipe of the vehicle 10. The docking cone 56 may be asymetrical about its axis if angular alignment with communications equipment is required. The nozzle 46 protrudes from the end of the docking cone 56 so that the conventional automatic shutoff equipment works properly.

Figure 8:
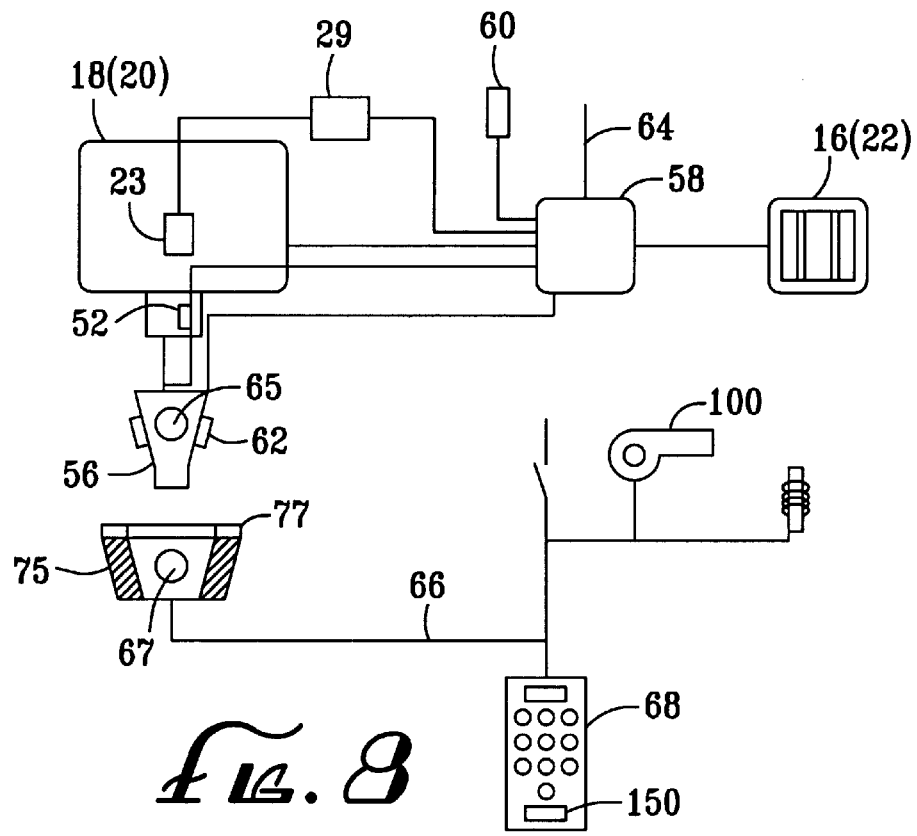
FIG. 8 is a schematic view of the positioning and data interchange system.
Figure 9:
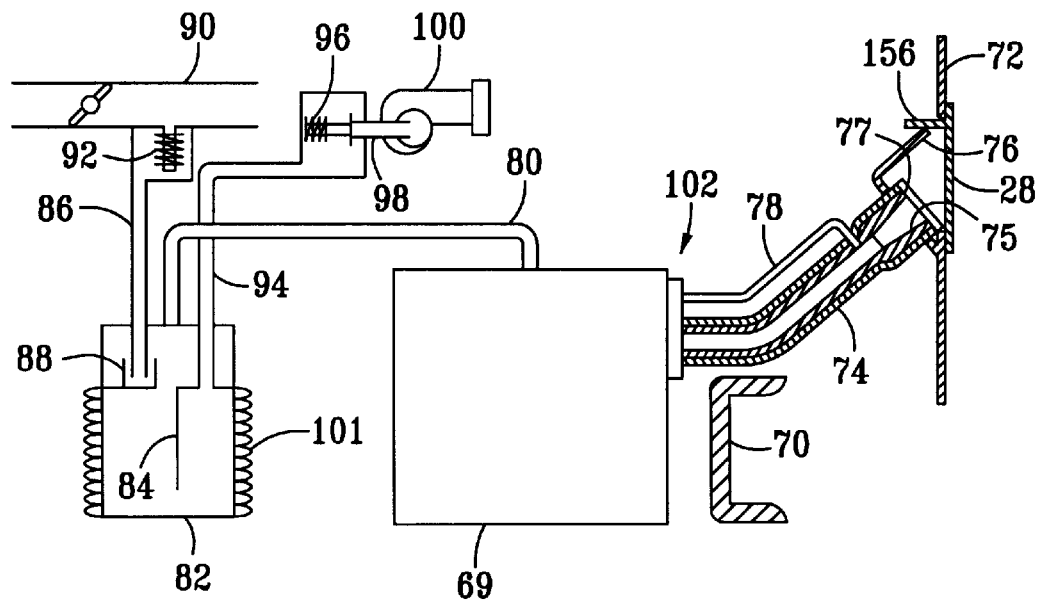
FIG. 9 is a schematic view of a fuel tank system.
Figure 10:
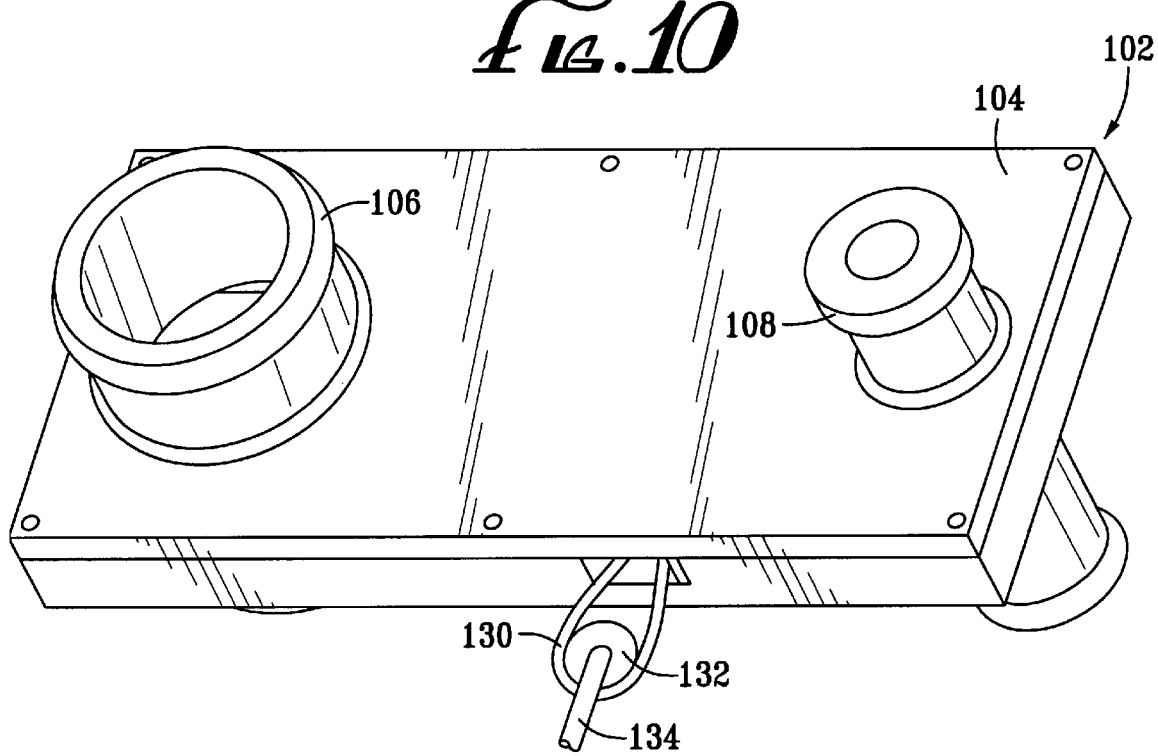
FIG. 10 is a perspective view of a fuel valve.
Figure 11:
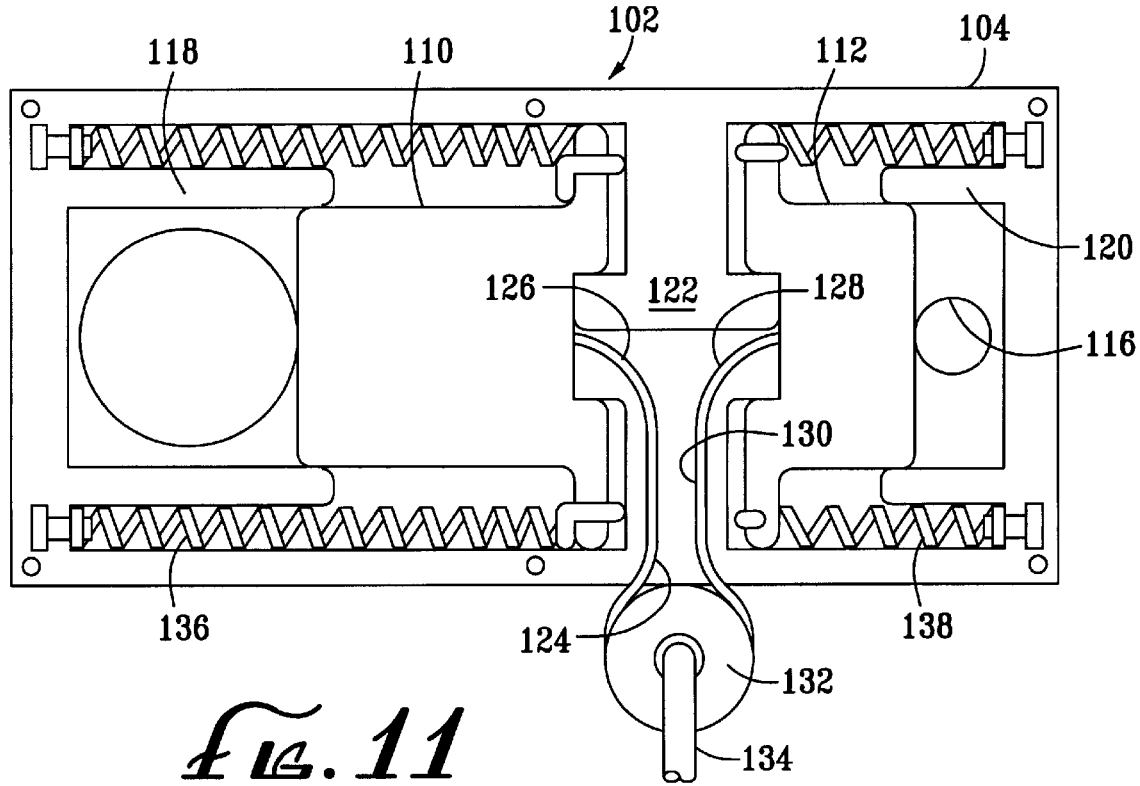
FIG. 11 is a cross-sectional plan view of the fuel valve.

The interface and sensing system associated with automatic fueling is illustrated in FIG. 8. A CPU 58 provides the system controller. The monitor 16 may be driven by the CPU 58. The CPU 58 also drives the pump assembly 18 and receives input from a sensor 60 to initiate the fueling operation. The sensor 60 may be located within the road bed to initialize the interface when a vehicle approaches. Alternatively, the sensor 60 may be a transponder which recognizes a bar code or chip on the vehicle. A vehicle identification could be used to input initial instructions such as which side of the vehicle the fuel door is on and the type of fuel desired. If the side of the vehicle is determined early, split images of the vehicle for alignment are not needed. Specific vehicle identification may also be provided, such as the VIN number, for legal reasons such as registration, location of stolen vehicles and insurance or for commercial reasons such as sales information specific to the vehicle make, etc.

Microswitches 62 located to either side of the conical plug 56 sense seating of the plug with the fuel port. The outputs of the switches 62 and the information from the camera 52 are also processed by the CPU 58. Finally, a data link is provided with the vehicle through the docking cone 56. This information is processed by the CPU as well which may also incorporate a telephone line 64.

A data link line 66 extends to the control panel at the operator position in the vehicle. A keypad 68 or mouse is coupled with the data link line 66. The keypad 68 may be incorporated into the radio where station buttons can double as base 10 integers. With full docking of the docking cone 56, communication may be transferred from the keypad 68 to the CPU 58. The keypad 68 may provide for interactive dialog with the CPU 58 as presented on the monitor 16. The keypad 68 may also have preprogrammed information such as credit numbers and the like for facile input to the filling station. The keypad 68 may also act as a terminal to receive data from a variety of systems within the vehicle, odometer reading, fuel level, other fluid levels being but a few. The communication across the docking cone 56 may be by tone pulse transceivers 65 and 67, electrical contacts, fiber optic light pulses or the like. Other systems for communication are also contemplated for direct broadcast links. An infrared transmitter such as on home video and audio equipment may be used. The signal may be generated remotely on the vehicle such as on a side view mirror. RF signals are also possible. Less security is provided by such broadcast links.

Turning to the vehicle side of the system, a fuel tank 69 is shown to be positioned inwardly of a vehicle frame 70 and also inwardly into the body 72 of the vehicle. The tank includes a fill pipe 74 leading from a cavity 76 defined in the outer surface of the body 72 to the tank 69. The fill pipe 74 includes an insert 75 having a tapered port therethrough. The tapered port is configured to receive the docking cone 56 so that the micro switches 62 will be closed with the cone 56 properly seated. The tapered port may include an angle on the lower side which is almost horizontal as positioned on the vehicle. Some angle allows fuel to flow into the fill pipe 74 to reduce the possibility of release into the atmosphere. An included angle of 45° has been found appropriate. Slight interlocking or rough elements on the tapered port and cone may be used to insure a mechanical seat if manual fueling is contemplated. A retro-reflective ring 77 extends around the tapered opening for targeting of the nozzle. A fuel door 28 extends over the cavity 76. The filler pipe 74 is shown to include an inner coating which is nonwetting to the fuel contemplated. As a result, little or no residual fuel remains in the fuel fill pipe 74 after filling is complete.

The tank 69 is contemplated to include the various components typically associated with such vehicle tanks. Such equipment includes grade vents and valves, overfill limiters, rollover stops, fuel limiter vent valves, and pressure relief valves. Tank sender units, baffles and the like are also contemplated. As they are conventional, they are not illustrated.

A signal tube 78 extends from the tank 69 to an upper portion of the fuel filler pipe 74. This is a conventional tube employed to actuate the automatic shutoff valve system of the fuel nozzle, also conventional in nature. As with the fuel fill pipe 74, the signal tube 78 is only operative during the fuel filling operation.

A tube 80 is associated with such elements as the grade vent valve and the pressure relief valve. The tube 80 extends to an evaporation canister 82. The canister 82 is partitioned by a baffle 84 in the main cavity where absorption media is retained to collect vapor. An open chamber above this cavity receives the tube 80 for interjection of fuel vapors. An exit tube 86 associated with a labyrinth 88 provides for flow of vapor from the upper chamber directly to the engine manifold 90. The exit tube 86 includes a solenoid 92 which controls purging of the canister depending on engine condition. On the opposite side of the absorbing media from the tube 80, a vent tube 94 extends to a vent solenoid 96 and to an exit vent 98 with a vacuum blower 100. As the media is less able to retain the fuel vapors when hot, heating coils 101 may be activated when the vehicle is running. This will drive the fuel vapor to purge to the engine. The coils 101 may be electrical, heated by the exhaust or engine coolant. A pressure relief system may also be incorporated as part of the vent 94. A one-way valve would allow flow back into the canister while a relief valve may be operated by over pressure within the system if pressure relief is desired through the canister rather than directly from the tank. A higher pressure relief valve may be provided directly from the tank for added safety under this circumstance.

A fuel intake valve, generally designated 102, is located between the fill pipe 74 and the fuel tank 69. The fuel intake valve 102 controls flow between the fill pipe 74 and the tank 69 and also controls flow from the tank 69 to the signal tube 78. The fuel intake valve 102 is shown to have a rectangular body 104 which may be affixed to the side of the fuel tank 69. A nipple 106 is designed for association with the fuel pipe 74. A displaced nipple 108 is associated with the signal tube 78. Nipples may also be provided on the reverse side for facile association with the fuel tank 68 through the wall thereof.

Internally, there are two slide valves 110 and 112. The slide valve 110 is a fuel fill valve which controls a first port 114 while the slide valve 112 is a signal tube valve which controls a smaller port 116. Parallel guides 118 and 120 align the valves 110 and 112, respectively. The slide valves 110 and 112 uncover the respective ports 114 and 116 as the valves move toward one another. A stop 122 is provided between the valves 110 and 112 to limit opening movement.

To control the fuel intake valve 102, an opening 124 is provided in the side of the body 104. The opening extends to the back end of the slide valves 110 and 112. Curved tracks 126 and 128 extend from the opening 124 toward the back end of each of the slide valves 110 and 112. A flexible cable 130 is attached at either end to the slide valves 110 and 112, respectively. The cable 130 is long enough to extend from the opening 124 with the loop thereof receiving a pulley 132. A cable assembly 134 leading from the pulley 132 is then able to draw the slide valves 110 and 112 toward one another so as to open the ports 114 and 116. Springs 136 and 138 bias the slide valves 110 and 112 toward the closed position over the ports 114 and 116. Thus, the control cable 134 operates against the springs 136 and 138 to open the ports.

Figure 12:
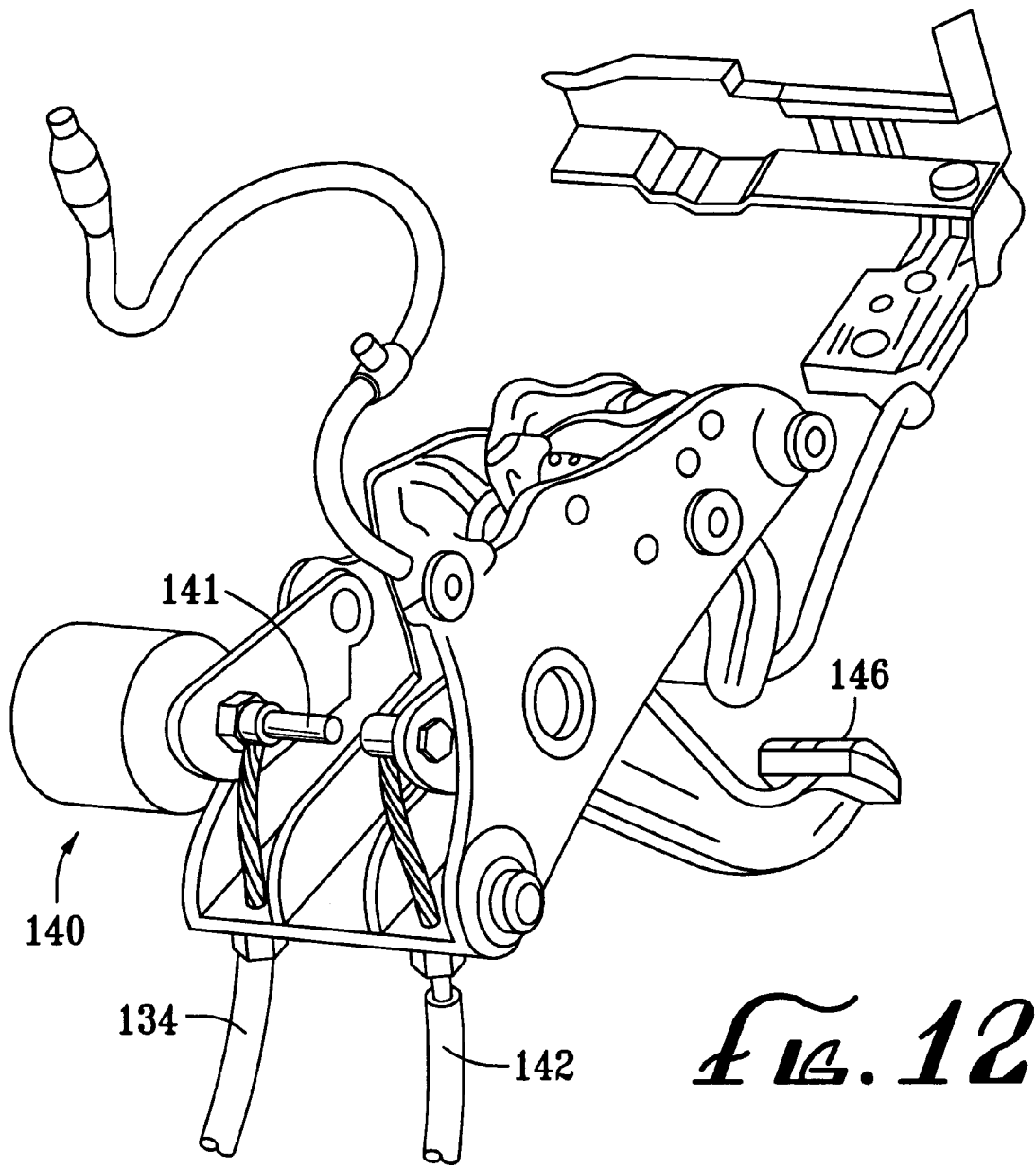
FIG. 12 is a perspective view of a first fuel valve actuator mechanism.

A control actuator, generally designated 140, operates the cable assembly 134. In FIG. 12, the control actuator 140 is a solenoid or vacuum actuated pin 141 which engages the emergency brake actuator 146. As the emergency brake is applied with the pin 141 extended, the cable assembly 134 is drawn in tension as well as the brake cable 142.

Figure 13:
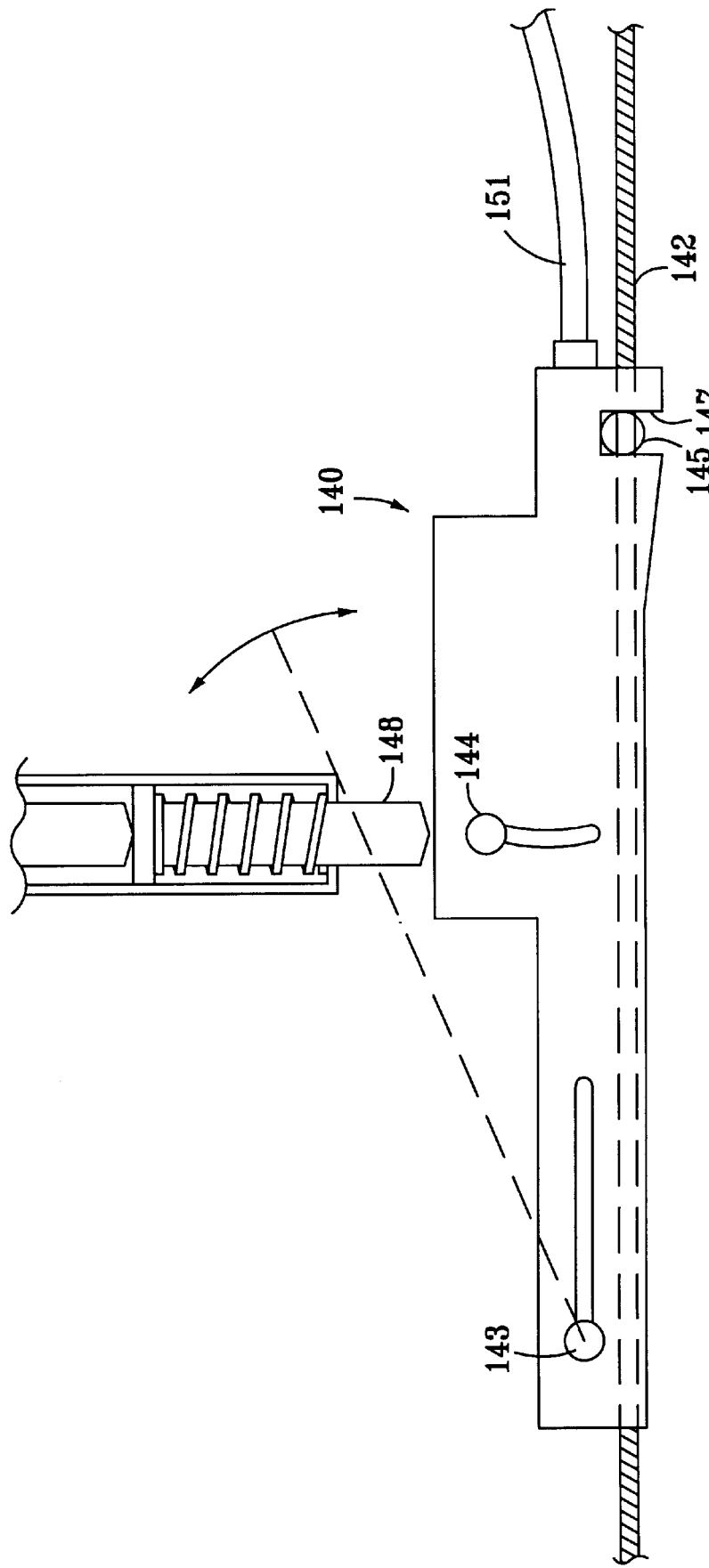
FIG. 13 is a plan view of a second fuel valve actuator mechanism.
Figure 14:
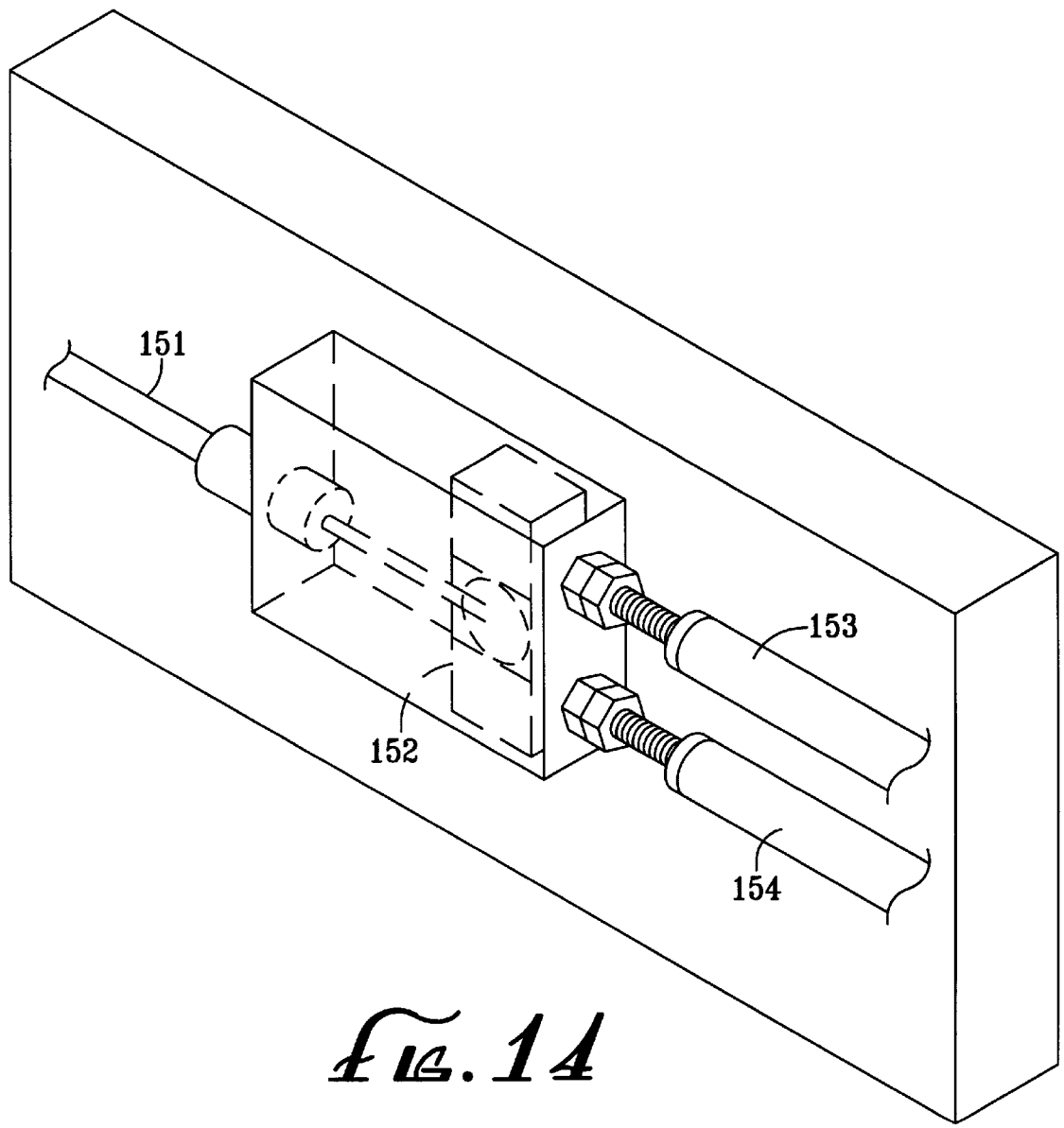
FIG. 14 is a portion of the linkage associated with the fuel valve.

In FIG. 13, the control actuator 140 is slidably and pivotally mounted to the vehicle frame at two pins 143 and 144 and selectively receives a block 145 on the brake cable 142 from the emergency brake actuator 146 in a notch 147. The brake cable 142 extends through the control actuator 140 and on to the emergency brakes (not shown). The cable assembly 134 is held to the control actuator 140. The control actuator 140 is spring biased from engagement with the brake cable 142. Engagement is effected by an actuator pin 148 which again may be driven by solinoid, vacuum or other conventional means on a vehicle. When the pin 148 extends to pivot the actuator 140, these cable assembly 134 and the brake cable 142 move together. In this way, the brake actuator 146 can operate the control cable assembly 134.

A switch 150 accessible to the vehicle operator can control the actuated pin 141 in the first actuator embodiment or the actuator pin 148 in the second actuator embodiment. In this configuration, the switch 150 must be actuated before the emergency brake actuator 146. This switch 150 may also control the energizing of the vacuum blower 100. The switch 150 could also actuate a separately driven unit or cylinder for powered opening of the valves 110 and 112.

The cable assembly 134 is illustrated as including an actuator cable 151 extending to a slide block 152. The slide block 152 engages a valve cable 153 and a fuel door cable 154. The slide block 152 can pivot about the attachment to the actuator cable 151 to accomodate any differences in throw.

Considering the operation of the system, a vehicle 10 equipped with the foregoing mechanisms is to drive into position between the islands 12 and 14 of the filling station. As the vehicle approaches, the sensor 60 is actuated and the computer 58 is initialized. A view from the cameras 52 of the sides of the vehicle alternatingly or together from pump assemblies 18 and 20 or from one camera 52 from one pump assembly 18 or 20 if the type of vehicle is remotely sensed is shown on the monitor 16. Vertical lines located on the monitor provide guidance to the operator of the vehicle 10 for bringing the vehicle into position such that the pump assemblies 18 or can reach the fuel tank inlet port. The driver shuts off the engine, actuates the switch 150 on the instrument panel or keypad 68 which actuates the pin 141 or 148 of the control actuator 140. Depression of the emergency brake actuator 146 then causes the emergency brake to be set and the control cable assembly 134 to be pulled. The emergency brake provides a safety factor against driving off before fueling is completed. By actuating the emergency brake, the fuel door 28 and the valves 110 and 112 are opened and ready for fueling. The fuel door 28 is on a pivot with an actuator arm 156. The fuel door 28 is opened and the ports 114 and 116 are also opened in preparation for fueling.

With the initializing of the computer 58 through actuation of the sensor 60, the light 54 on the fueling nozzle was turned on. Once the fuel door 28 is open, the camera 52 is able to recognize the retro-reflective annular target reflecting the signature light 54. The retro-reflective target 77 is circular but the view of the camera 52 is foreshortened. The camera 52 is a CCD sensor with the image digitized into pixels. Artificial intelligence software is typically used to identify a target based on known features. Once recognized, acquisition and mating is initiated. To acquire recognition, the camera image is smoothed and binarized to a white/black image from a gray-scale image. A Sobel edge-detection filter then defines the concentric ellipses in the image. The image is thinned to make the white regions as thin as possible without losing connectivity and a blob analysis is performed and analyzed based on established criteria such as minimum size, maximum size, compactness, etc. A search is made for concentric blobs and the maximum feret diameters are determined to get the average major axis length of the concentric ellipses. This length is then used with an emperical calibration curve to obtain the distance from the camera to the target. The center location for the concentric ellipses is used with this distance to define the fuel port in three dimensional space. Contrast between the target 77 and what lies around it provide for the recognition. A first location and distance is calculated. The telescoping arm 44 is then driven to a position near to that calculated to be the location of the fuel inlet. At this point, a second calculation is made which, because the camera 52 is closer, is more exact. Following a second position analysis, the telescoping arm 44 with the nozzle 46 extends to engage the docking cone 56 into the end of the fill pipe 74. The microswitches 62 are depressed and fueling can begin.

To initiate fueling, the vehicle operator interfaces with the computer 58 through the keypad 68. The monitor 16 may prompt the operator with questions. A code representing the identification or release of credit information is then entered by the driver. This information may be communicated by telephone line 64 to an approval bureau. Once the transaction is approved, the pump assembly is actuated to pump fuel into the fuel tank.

Collaterally with the opening of the fuel intake valve 102, the vacuum blower 100 is activated. This will draw vapor away from the fill pipe 74 and collect the displaced vapor and gases as fuel flows into the tank 68.

With the nozzle sensing a full tank through the signal tube 78, pumping is discontinued and the pump assembly 18, 20 retracts to its stowed position. The sale is then complete and the operator can release the emergency brake, start the vehicle and leave the filling station. Release of the emergency brake may be used to shut off the blower 100 and to send a signal to the pump to turn off and retract (if that did not already occur). This maneuver avoids damage to the vehicle and the pump. Other devices may be used to terminate fueling. Activation of the vehicle starter, shifting of an automatic transmission from park, turning on the ignition or activation of a fuel terminate switch on the keypad 68 may be made available and used. It is possible that some people may use release of the emergency brake to terminate filling early on purpose. In this event, fuel may remain in the fuel pipe. A damped closure of the valves 110 and 112 would allow all remaining fuel to flow into the tank before closure.

Accordingly, an improved automatic fuel filling system is disclosed along with the components associated with both the pump assembly and the vehicle. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. An fueling system comprising
   a fuel tank;
   an evaporation canister having a flowpath therethrough and vapor collecting media in the flowpath;
   a first vent from the fuel tank to the evaporation canister in communication with one end of the flowpath;
   a second vent from the evaporation canister to atmosphere in communication with the other end of the flowpath;
   a vacuum blower on the second vent to selectively extract fuel from the canister;
   a switch to actuate the vacuum blower when the fuel tank is in the fill mode.

2. The fueling system of claim 1 further comprising
   a heating element about the evaporation canister.

3. The fueling system of claim 1 further comprising
   a fill pipe in communication with the interior of the tank;
   a fuel inlet valve adjacent the wall of the tank and receiving the fill pipe.

4. A fueling system for a vehicle having a frame and a body, comprising
   a fuel tank held and positioned within the frame;
   a fill pipe in communication with the tank and extending outwardly of the frame to the body;
   a fuel inlet valve adjacent the wall of the tank inwardly of the frame and receiving the fill pipe, the fuel inlet valve including a valve body fixed relative to the fuel tank and a fuel fill valve in the valve body controlling the communication between the tank and the fill pipe;
   a signal tube in communication with the tank and extending to the fill pipe, the fuel inlet valve including a signal tube valve controlling the communication between the tank and the fuel signal tube.

5. The fueling system of claim 4, the fuel fill valve and the signal tube valve being slide valves.

6. The fueling system of claim 4, the fill pipe having an interior surface nonwetting to fuel.

7. A fueling system for a vehicle having a body and a fuel tank fixed relative to the body, comprising
   a fill pipe extending from the tank;
   a fuel inlet port through the body and coupled with the fill pipe;
   a fueling station including a fuel arm receivable by the fuel inlet port and a display screen;
   a vehicle input circuit including a first communication element at the fuel inlet port;
   a fueling station logic circuit including a second communication element at the fuel arm selectively in communication with the first communication element with the fuel arm engaged with the fuel inlet port and an interface with the display screen, responses to prompting from the display screen being transmitted by the input circuit and the station logic circuit.

8. The fueling system of claim 7, the fueling station further including a sensor on the fuel arm to recognize the filler pipe extending from the tank and an object recognition and locating system receiving input from the sensor and directing the arm, the fuel arm including a nozzle and a resilient mounting for the nozzle to allow reorientation of the nozzle upon engagement with the fuel inlet port.

9. The fueling system of claims 8, the filler pipe including a tapered entrance and the fuel nozzle having a tapered exterior surface portion selectively seating in the tapered entrance.

10. The fueling system of claim 7, the first communication element being a tone pulse transmitter, the second communication element being a tone pulse receiver.

11. The fueling system of claim 7, the first and second communication elements being tone pulse transceivers.

12. The fueling system of claim 7, the vehicle input circuit further including an input pad in the vehicle, the pad including keys to input credit information and pump selections.

13. A fueling system for a vehicle including a frame, a fuel tank fixed relative to the frame, a fuel inlet to the fuel tank, a fuel door to the fuel inlet and a parking brake system mounted to the frame and having a parking brake actuator and a control cable, comprising
   a closure valve on the fuel inlet;
   a junction actuator fixed relative to the frame at the control cable and including a drive element fixed to the control cable and a driven element movable in the junction actuator with the control cable;
   a fuel door cable coupled with the fuel door and the driven block to open the fuel door with movement of the driven block;
   a closure valve cable coupled with the closure valve and the driven block to open the closure valve with movement of the driven block;
   an engagement operatively extending between the drive element and the driven element to selectively engage the drive element and the driven element to move together with application of the parking brake actuator.

14. The fueling system of claim 13, the engagement including a control in the vehicle to select engagement of the drive element and the driven element, the engagement being normally biased toward disengagement.

15. The fueling system of claim 14, the control including a control circuit having a solenoid and a switch, the engagement having a pin coupled to the solenoid.

16. A fueling system for a vehicle including a frame and a body, comprising
   a fuel tank held and positioned within the frame;
   a fill pipe in communication with the tank and extending outwardly of the frame to the body;
   a fuel inlet valve adjacent at the tank, inwardly of the frame and receiving the fill pipe;
   a fuel door at the body to selectively cover the end of the fill pipe;
   an emergency brake system mounted to the frame and having an emergency brake actuator and a brake cable;
   a cable assembly including a valve cable coupled to the fuel inlet valve, a fuel door cable coupled to the fuel door and a control actuator selectively coupling the cable assembly with the emergency brake system for control of the fuel inlet valve and the fuel door by the emergency brake actuator.

17. The fueling system of claim 16, the control actuator having a pin selectively engageable with the emergency brake actuator.

18. The fueling system of claim 16, the control actuator having a pin selectively engageable with the emergency brake cable.

19. The fueling system of claim 16, the fuel inlet valve including a valve body fixed relative to the fuel tank and a fuel fill valve in the valve body controlling the communication between the tank and the fill pipe.

20. The fueling system of claim 19 further comprising
   a signal tube in communication with the tank and extending to the fill pipe, the fuel inlet valve including a signal tube valve controlling the communication between the tank and the fuel signal tube.

21. The fueling system of claim 20, the fuel fill valve and the signal tube valve being slide valves.

22. The fueling system of claim 20, the fill pipe having an interior surface nonwetting to fuel.

* * * * *